United States Patent
Takehana et al.

(10) Patent No.: US 10,668,658 B2
(45) Date of Patent: Jun. 2, 2020

(54) BLOW MOLDING APPARATUS

(71) Applicant: NISSEI ASB MACHINE CO., LTD., Nagano (JP)

(72) Inventors: Daizaburo Takehana, Nagano (JP); Masaki Yamaguchi, Nagano (JP); Tomoaki Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 16/138,636

(22) Filed: Sep. 21, 2018

(65) Prior Publication Data

US 2019/0022913 A1 Jan. 24, 2019

Related U.S. Application Data

(63) Continuation of application No. PCT/JP2017/013418, filed on Mar. 30, 2017.

(30) Foreign Application Priority Data

Mar. 30, 2016 (JP) .................................. 2016-069383

(51) Int. Cl.
*B29C 49/18* (2006.01)
*B29C 49/42* (2006.01)
(Continued)

(52) U.S. Cl.
CPC ........ *B29C 49/061* (2013.01); *B29C 49/0005* (2013.01); *B29C 49/06* (2013.01);
(Continued)

(58) Field of Classification Search
CPC .... B29C 49/18; B29C 49/185; B29C 49/4205
See application file for complete search history.

(56) References Cited

U.S. PATENT DOCUMENTS

| 4,836,971 A | 6/1989 | Denis et al. |
| 5,281,387 A | 1/1994 | Collette et al. |

(Continued)

FOREIGN PATENT DOCUMENTS

| CN | 102656001 | 9/2012 |
| CN | 103889685 | 6/2014 |

(Continued)

OTHER PUBLICATIONS

International Search Report in International Patent Application No. PCT/JP2017/013418, dated May 9, 2017.

(Continued)

*Primary Examiner* — Robert B Davis
(74) *Attorney, Agent, or Firm* — Greenblum & Bernstein, P.L.C.

(57) ABSTRACT

A blow molding apparatus includes: an injection molding section for injection molding a plurality of preforms at a time; a cooling section for cooling the preforms; a heating section for heating the preforms while continuously transporting them along a transport line; and a blow molding section for blow molding the preforms to form hollow containers. The blow molding section includes a primary blow molding section which is equipped with a heat-treating blow mold and blow molds the preforms moved from the transport line into the heat-treating blow mold to form intermediate molded products, and a secondary blow molding section which is equipped with a final blow mold and blow molds the intermediate molded products moved from the heat-treating blow mold into the final blow mold to form the hollow containers.

7 Claims, 4 Drawing Sheets

(51) Int. Cl.
  *B29C 49/06* (2006.01)
  *B29C 49/00* (2006.01)
  *B29C 49/32* (2006.01)
  B29K 67/00 (2006.01)
  B29L 31/00 (2006.01)

(52) U.S. Cl.
  CPC .............. *B29C 49/18* (2013.01); *B29C 49/32* (2013.01); *B29C 49/4205* (2013.01); *B29K 2067/003* (2013.01); *B29L 2031/7158* (2013.01)

(56) References Cited

U.S. PATENT DOCUMENTS

| | | | |
|---|---|---|---|
| 5,975,880 A * | 11/1999 | Takada | B29C 49/18 425/526 |
| 10,065,357 B2 * | 9/2018 | Tanabe | B29C 49/4205 |
| 2013/0037507 A1 | 2/2013 | Aoki et al. | |
| 2013/0236589 A1 * | 9/2013 | Yamaguchi | B29C 49/06 425/526 |
| 2014/0225315 A1 | 8/2014 | Ogihara | |
| 2014/0271976 A1 | 9/2014 | Yamaguchi | |
| 2015/0166211 A1 | 6/2015 | Aoki et al. | |
| 2016/0031146 A1 | 2/2016 | Yamaguchi | |
| 2016/0221246 A1 | 8/2016 | Tanabe et al. | |

FOREIGN PATENT DOCUMENTS

| | | |
|---|---|---|
| EP | 0559103 | 9/1993 |
| EP | 2517862 | 10/2012 |
| EP | 2769826 | 8/2014 |
| JP | 58-140225 | 8/1983 |
| JP | 4-39416 | 6/1992 |
| JP | 3907494 | 1/2007 |
| JP | 5033469 | 7/2012 |
| WO | 2013/027692 | 2/2013 |
| WO | 2015/056636 | 4/2015 |

OTHER PUBLICATIONS

International Preliminary Report on Patentability in International Patent Application No. PCT/JP2017/013418, dated Oct. 2, 2018.
Extended European Search Report dated Dec. 5, 2019 in EP Application No. 17775476.9.
Office Action dated Jan. 20, 2020 in CN Application No. 201780021740.5 and English language translation thereof.

* cited by examiner

BLOW MOLDING APPARATUS

This application is a Continuation of PCT International Application No. PCT/JP2017/013418, filed on Mar. 30, 2017, which claims priority under 35 U.S.C. 119(a) to Patent Application No. 2016-069383, filed in Japan on Mar. 30, 2016, all of which are hereby expressly incorporated by reference into the present application.

TECHNICAL FIELD

This invention relates to a blow molding apparatus and, in particular, relates to a blow molding apparatus for forming a heat-resistant container.

BACKGROUND ART

Hollow containers having heat resistance (may hereinafter be referred to as heat-resistant containers), which use resin materials such as polyethylene terephthalate (PET), have so far been known. Such heat-resistant containers are generally formed by blow molding injection-molded preforms. In detail, methods called 2-step methods or cold parison methods are available as blow molding methods for heat-resistant containers (see, for example, Patent Documents 1 to 3).

Also available are methods for imparting heat resistance to hollow containers formed by blow molding methods called 1-blow methods or hot parison methods (see, for example, Patent Document 4).

PRIOR ART DOCUMENTS

Patent Documents

Patent Document 1: JP-A-Sho-58-140225
Patent Document 2: JP-B-Hei-04-039416
Patent Document 3: Japanese Patent No. 3907494
Patent Document 4: Japanese Patent No. 5033469

SUMMARY OF THE INVENTION

Problems to be Solved by the Invention

Apparatuses adopting the above-mentioned 2-step method enable heat-resistant containers to be mass-produced. However, they pose the problems that the initial cost is high and the space for installation of required facilities is wide. Apparatuses adopting the 1-step method, on the other hand, involve the problem that the production volume is extremely low, although the initial cost is reduced and the space for installation of the facilities is relatively limited.

The present invention has been accomplished in the light of the above circumstances. It is an object of the invention to provide a blow molding apparatus which can reduce the initial cost, keep the space for installation of facilities relatively limited, and increase the production volume of heat-resistant containers.

Means for Solving the Problems

A first aspect of the present invention, intended to solve the above problems, is a blow molding apparatus comprising: an injection molding section, a cooling section, a heating section and a blow molding section, wherein the injection molding section injection molds a plurality of preforms at a time; the cooling section cools the injection-molded preforms; the heating section heats the cooled preforms while continuously transporting them along a transport line; and the blow molding section blow molds the heated preforms to form hollow containers, the blow molding section including a primary blow molding section which is equipped with a heat-treating blow mold and blow molds the preforms moved from the transport line into the heat-treating blow mold to form intermediate molded products; and a secondary blow molding section which is equipped with a final blow mold and blow molds the intermediate molded products moved from the heat-treating blow mold into the final blow mold to form hollow containers as final molded products.

A second aspect of the present invention is the blow molding apparatus according to the first aspect, wherein the injection molding section injection molds the N (N is an integer of 2 or larger) preforms at a time; the primary blow molding section divides the N preforms into n portions (n is an integer of 2 or larger), and forms the M (N/n: M is a natural number) preforms, at a time, into the intermediate molded products; and the secondary blow molding section forms the M intermediate molded products into the hollow containers at a timing when the M intermediate molded products are formed in the primary blow molding section.

A third aspect of the present invention is the blow molding apparatus according to the second aspect, wherein the injection molding section injection molds the preforms in a molding time T fulfilling conditions of the following Equation (1):

$$T \geq N/M(t+\alpha) \qquad (1)$$

where t is a heat-treating blow molding time $t1$, or a final blow molding time $t2$, whichever is longer, and $\alpha$ is a time during which the intermediate molded product moves from the heat-treating blow mold to the final blow mold.

A fourth aspect of the present invention is the blow molding apparatus according to the first aspect, wherein the heat-treating blow mold and the final blow mold are disposed adjacently.

A fifth aspect of the present invention is the blow molding apparatus according to the fourth aspect, wherein the blow molding section is equipped with a mold clamping device for integrally moving the heat-treating blow mold and the final blow mold and clamping them together.

Effects of the Invention

According to the blow molding apparatus of the present invention described above, it is possible to suppress the initial cost and keep the space for installation of facilities relatively limited. Since heat-resistant containers can be produced continuously, moreover, the production volume of the heat-resistant containers can be increased.

MODE FOR CARRYING OUT THE INVENTION

An embodiment of the present invention will now be described in detail by reference to the accompanying drawings.

First of all, a method for producing a hollow container (heat-resistant container) by a blow molding apparatus according to the present invention will be described briefly.

Figure 1:
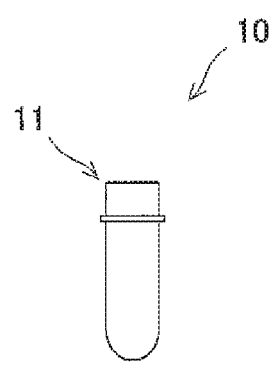
FIGS. 1(a) to 1(c) are schematic views illustrating a method for producing a hollow container by a blow molding apparatus according to the present invention.
Figure 1:
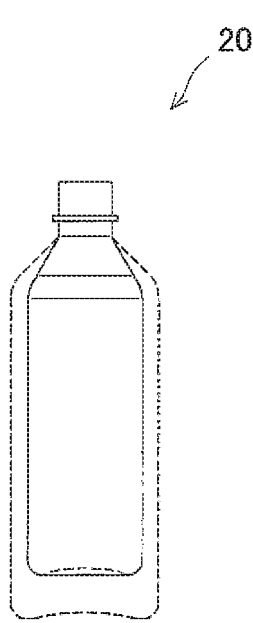
Figure 1:
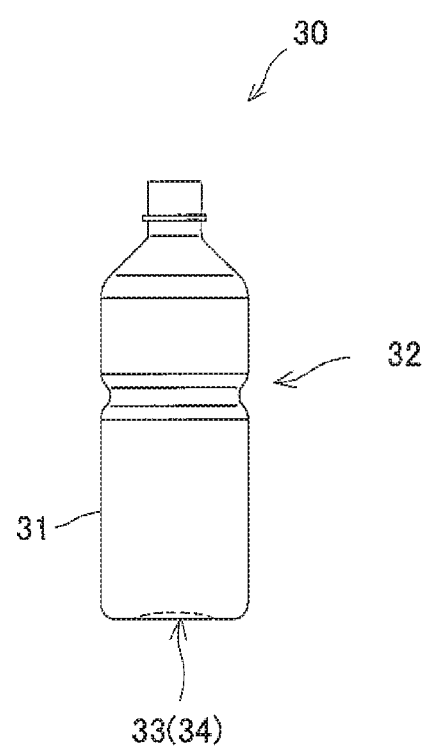

As shown in FIG. 1(a), a bottomed cylinder-shaped preform 10 having a neck portion 11 is formed by injection molding. As shown in FIG. 1(b), the preform 10 is subjected to heat-treating blow molding (primary blow molding) to form an intermediate molded product 20. Then, as shown in FIG. 1(c), the intermediate molded product 20 is subjected to final blow molding (secondary blow molding) to form a hollow container 30. The intermediate molded product 20 is once expanded to a size greater than the hollow container 30 in the heat-treating blow molding as shown by a dashed line in the drawing, and is then contracted to a size smaller than the hollow container 30, as shown in FIG. 1(b), before the final blow molding.

The hollow container 30 is, for example, a heat-resistant bottle to be filled with a liquid such as a beverage, and is formed from a resin material such as PET. The hollow container 30 according to the present embodiment has a concavity 32 formed in a circumferential direction in its barrel 31, and its bottom 33 is formed with an upper bottom portion 34 protruding inwardly in the container. Of course, this shape of the hollow container 30 is an example, and the shape of the hollow container 30 is not limited to a particular shape.

Figure 2:
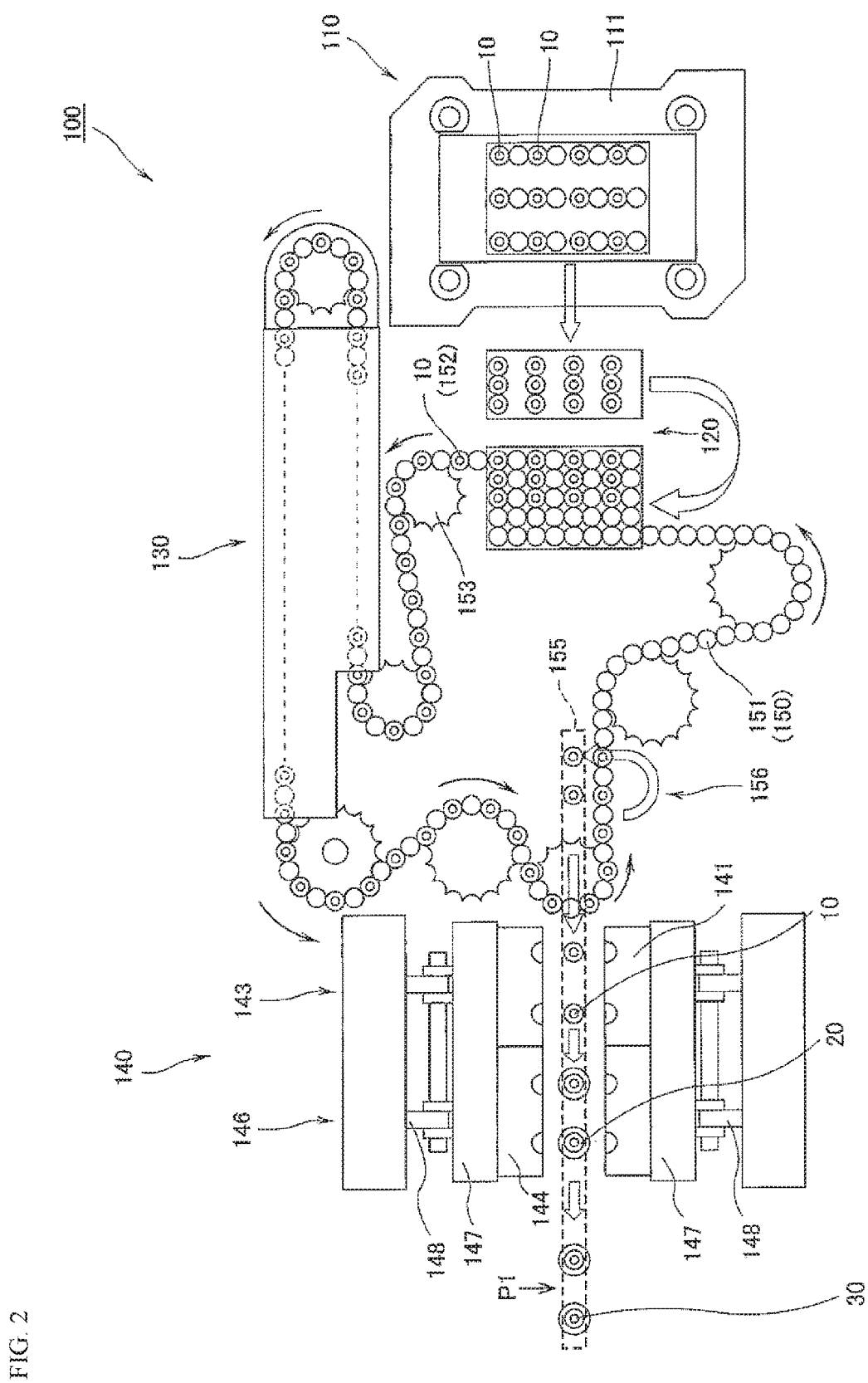
FIG. 2 is a view showing the schematic configuration of the blow molding apparatus according to the present invention.

A blow molding apparatus for producing such a hollow container 30 will be described below. As shown in FIG. 2, a blow molding apparatus (injection stretch blow molding apparatus) 100 is equipped with an injection molding section 110 for injection molding a preform 10 in the shape of a bottomed cylinder, a cooling section 120 for cooling the preform 10 molded by the injection molding section 110, a heating section (a heater) 130 for heating the preform 10, and a blow molding section 140 for blow molding the preform 10 heated by the heating section 130, thereby forming the hollow container 30.

The injection stretch blow molding apparatus 100 is an apparatus, called a 1.5-step system, in which the injection molding section 110 and the blow molding section 140 are connected together in line, but the number of products injection molded simultaneously and the number of products blow molded simultaneously do not coincide.

The injection stretch blow molding apparatus 100 is also equipped with a transport section 150 including a loop-shaped transport line (transport path) 151 circulating from the cooling section 120 to the heating section 130 and the blow molding section 140 and among them. The transport section 150 transports the preform 10 from the cooling section 120 to the heating section 130 along the transport line 151, and transports the preform 10 heated by the heating section 130 toward the blow molding section 140. Further, the transport section 150 is equipped with a grasping mechanism transport section 155 for grasping the preform 10 conveyed along the transport line 151 and carrying it into the blow molding section 140. The grasping mechanism transport section 155 carries the preform 10 into the blow molding section 140 and, as will be described later, grasps and transports the intermediate molded product 20 within the blow molding section 140. Also, the grasping mechanism transport section 155 grasps the hollow container 30, which is a final molded product, and carries the hollow container 30 out of the blow molding section 140 as far as the position of withdrawal.

The injection stretch blow molding apparatus 100 according to the present invention is characterized by the configuration of the blow molding section 140. Other configurations such as those of the injection molding section 110, the cooling 120, and the heating section 130 are publicly known, so that they will be explained briefly (if necessary, reference is requested to, for example, WO2013/027692 belonging to the present applicant).

The injection molding section 110 is equipped with a mold clamping mechanism (mold clamping device) 111, which clamps a core mold disposed above and a cavity mold disposed below, although their illustrations are omitted. In the injection molding section 110, a resin material (starting material) is charged by an injection device into an injection space defined by the core mold and the cavity mold, whereby a plurality of the preforms 10 are injection molded.

The mold release temperature of the preform 10 in the injection molding section 110 may be a temperature at which a skin layer cured enough to be capable of maintaining an appearance shape during release from the cavity mold is formed on the surface of the preform 10 (i.e., a temperature at which a core layer inward of the skin layer is in a softened state). It is not necessary for the preform 10 to be cooled to a temperature at which a shape change does not occur during mold release as in the 2-step method (a temperature at which the skin layer and the core layer are in a cured state).

Incidentally, the injection molding section 110 is configured to be capable of molding the N (N is an integer of 2 or greater) preforms 10 at a time. Concretely, the injection molding section 110 is configured to be capable of simultaneously molding 24 (3 rows×8/row) of the preforms 10 at the maximum. In the present embodiment, the injection molding section 110 has been set to mold 12 (3 rows×4/row) of the preforms 10 at a time.

The cooling section 120 cools the preform 10 (forced cooling or post-cooling). The preform 10, which has been injection molded by the injection molding section 110 and cooled to the mold release temperature as stated above, is transported from the injection molding section 110 to the cooling section 120 by a transport device (not shown). In the cooling section 120, the preform 10 is cooled again (forced cooling or post-cooling). The preforms 10 each having a surface temperature lowered to a predetermined temperature (for example, 60° C. to 100° C.) in the cooling section 120 are sent out to the transport line 151 constituting the transport section 150, and continuously transported along the transport line 151.

This treatment in the cooling section 120 eliminates nonuniform temperature distributions (heat history) among a plurality of the preforms 10 ascribed to differences in the cooling rate arising in the injection molding section 110. Hence, the thus cooled preforms 10 are blow molded in the blow molding section 140 as will be described later, whereby containers of more uniform quality can be produced.

Each preform 10 is molded in an upright state, with its neck portion 11 facing upward, in the injection molding section 110 and, in this state, is transported from the injection molding section 110 to the cooling section 120. The cooling section 120 has a reversal mechanism (not shown) for reversing the preform 10, transported in such an upright state, into an inverted state with its neck portion 11 facing downward. Each preform 10, while being cooled in the cooling section 120, is reversed into the inverted state by the reversal mechanism, and is held in the inverted state on a transport jig 152. In the present embodiment, as described above, 12 of the preforms 10 are formed in the injection molding section 110. Thus, the preforms 10 are held, respectively, on the transport jigs 152 provided alternately and transported continuously.

The transport line 151 is configured such that the plurality of transport jigs 152 are transported continuously one after another by the driving force of sprockets 153, etc. The transport jigs 152 are arranged in a plurality of rows below the cooling section 120, and the transport jigs 152 holding the preforms 10 are carried out successively onto the transport line 151. Then, the preforms 10 held by the transport jigs 152 are transported along the transport line 151, and carried into the heating section (heater) 130.

In the heating section 130, the preform 10 held by the transport jig 152 is heated to a temperature suitable for stretching (e.g., 85° C. to 110° C.), while being moved along the transport line 151. The transport section 150 is configured such that the transport jig 152 moves while rotating on its axis on the transport line 151. That is, within the heating section 130, the preform 10 is heated while rotating on its axis. Consequently, in the heating section 130, the preform 10 can be heated to a nearly uniform temperature over its entire circumference.

After the preform 10 is heated by the heating section 130, the preform 10 is further transported along the transport line 151 and carried into the blow molding section 140. In detail, the preform 10 is transported to a reversal section 156, which is equipped with a reversal mechanism (not shown), along the transport line 151. The preforms 10 continuously transported along the transport line 151 are reversed by a predetermined number of them at a time, and thereby brought into an upright state, in the reversal section 156. The preforms 10 in the upright state are grasped by the aforementioned grasping mechanism transport section 155 and transported into the blow molding section 140. It suffices that the grasping mechanism transport section 155 be configured to be capable of grasping the neck portion 11 of the preform 10 and, in this state, moving the preform 10 to the blow molding section 140. There is no particular restriction on the structure of the grasping mechanism transport section 155.

Figure 3:
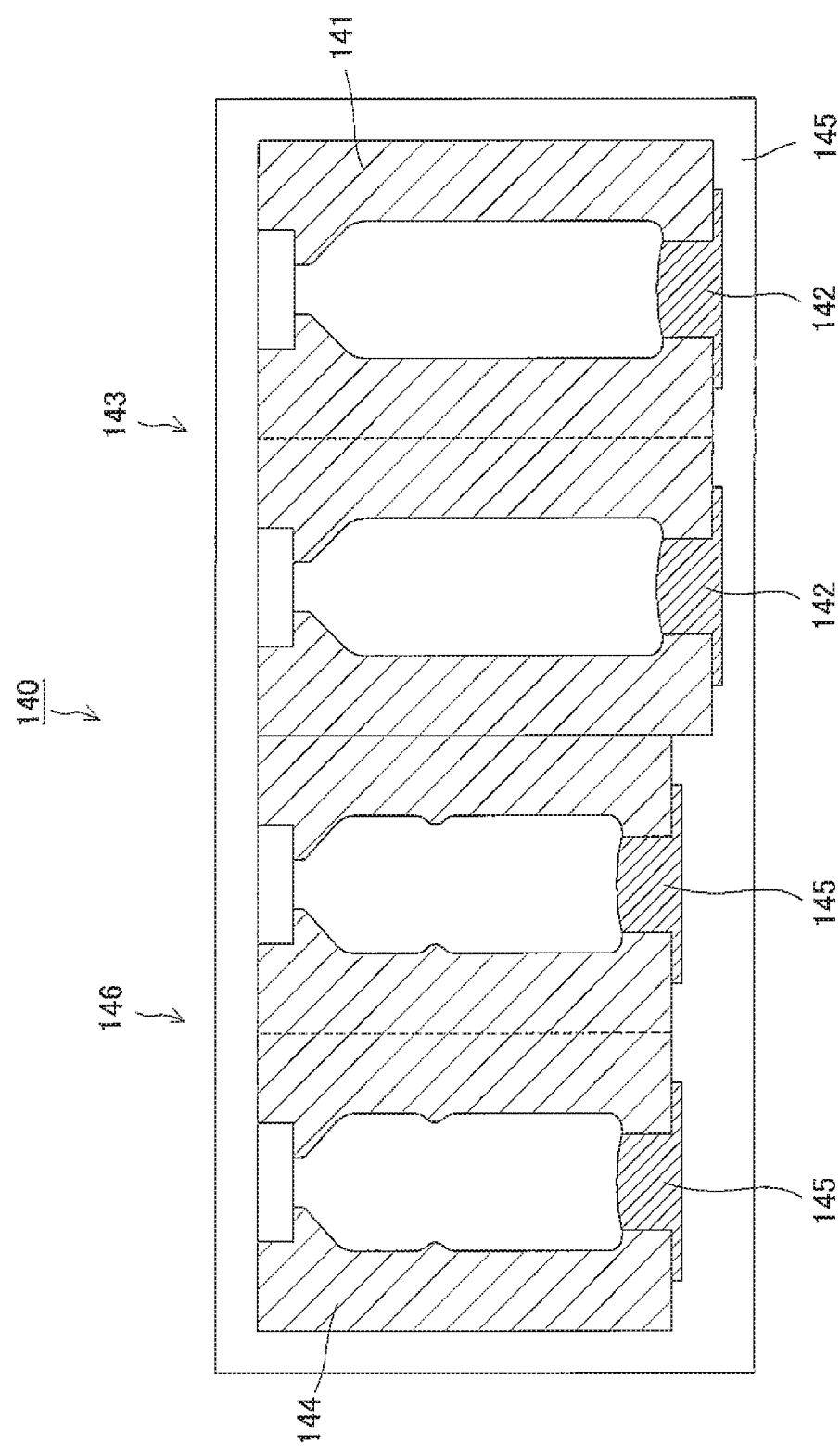
FIG. 3 is a view illustrating the configuration of a blow molding section according to the present invention, and a sectional view of a heat-treating blow mold and a final blow mold.

The blow molding section 140, as shown in FIGS. 2 and 3, is composed of an intermediate blow molding section (a primary blow molding section) 143 equipped with a heat-treating blow mold 141 constituted by a pair of split molds, and a bottom mold 142; and a final blow molding section (secondary blow molding section) 146 equipped with a final blow mold 144 constituted by a pair of split molds, and a bottom mold 145. The intermediate blow molding section 143 and the final blow molding section 146 are disposed adjacently, and the heat-treating blow mold 141 and the final blow mold 144 are adapted to be integrally moved and clamped. In the present embodiment, the heat-treating blow mold (one of the split molds) 141 and the final blow mold (one of the split molds) 144 are fixed to a blow mold fixing plate 147 which is a sheet of plate, and a mold clamping device (mold clamping mechanism) 148 is coupled to the blow mold fixing plate 147. That is, the single mold clamping device 148 moves a pair of the blow mold fixing plates 147, thereby simultaneously mold-clamping or mold-opening the heat-treating blow mold 141 and the final blow mold 144.

A predetermined number of the preforms 10 grasped by the grasping mechanism transport section 155 in the reversal section 156 are carried into the heat-treating blow mold 141.

The grasping mechanism transport section 155 adjusts the spacing between the preforms 10 appropriately while sliding the preforms 10.

Figure 4:
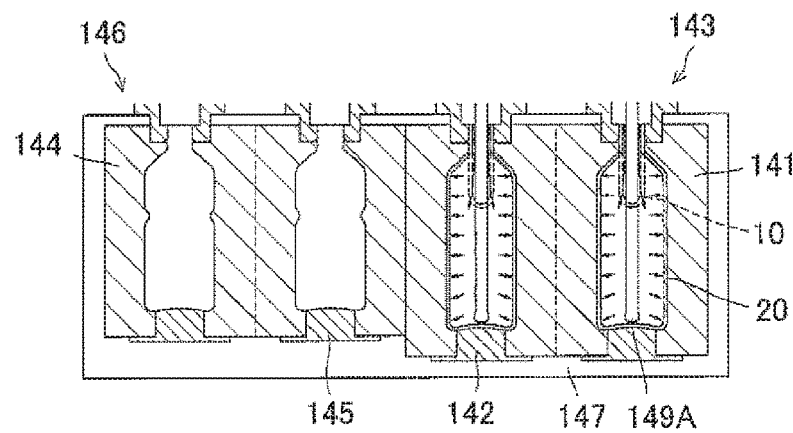
FIGS. 4(a) to 4(c) are views illustrating the procedure for molding of the hollow container by the blow molding section according to the present invention.
Figure 4:
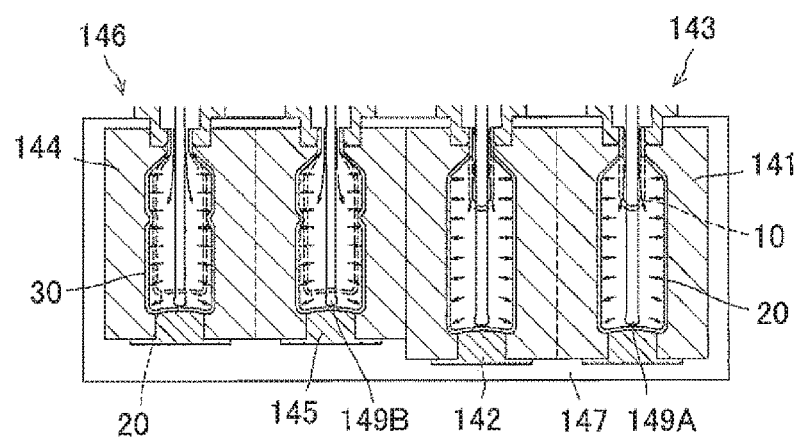
Figure 4:
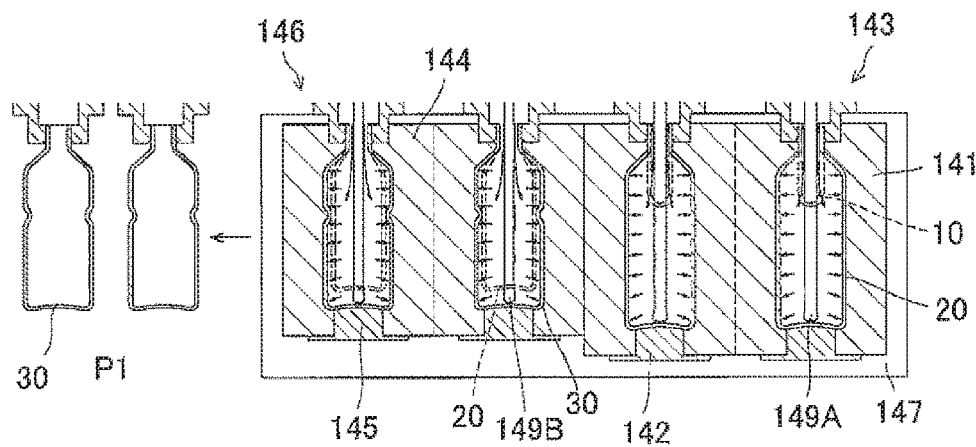

The intermediate blow molding section 143 subjects the preforms 10 disposed within the heat-treating blow mold 141 to heat-treating blow molding (primary blow molding) to form the intermediate molded products 20 each of a slightly smaller size than the hollow container 30 which is the final molded product. Concretely, as shown in FIG. 4(a), the preform 10 disposed within the heat-treating blow mold 141 is blow molded. That is, a stretching rod 149A is inserted into the preform 10 to drive it so as to extend. At the same time, high pressure blow air is supplied into the preform 10, whereby the preform 10 is stretched in a vertical axis direction and a horizontal axis direction. These actions result in the formation of the intermediate molded product 20 of a slightly larger size than or nearly the same size as the size of the hollow container 30 which is the final molded product. FIG. 4(a) shows a state in which 2 of the preforms 10 transported into the heat-treating blow mold 141 first of all are molded into the intermediate molded products 20.

In the intermediate blow molding section 143, moreover, the heat-treating blow mold 141 is heated to a predetermined temperature (e.g., 140° C. to 200° C.) to heat-treat the intermediate molded product 20. Concretely, with high pressure blow air being supplied into the intermediate molded product 20, the heat-treating blow mold 141 is heated, and the intermediate molded product 20 is contacted with the surface of the internal wall of the heat-treating blow mold 141 for a predetermined period of time to perform heat treatment (annealing and heat setting). At this time, the residual stress of the intermediate molded product 20 comprising a PET resin is relaxed, and the crystallization density is increased. That is, the annealing and heat setting enhance the heat resistance. Then, blow air within the intermediate molded product 20 is discharged as exhaust air. In accordance with this discharge, the intermediate molded product 20 contracts, and settles into a slightly smaller size than the size of the hollow container 30 which is the final molded product.

Incidentally, in the intermediate blow molding section 143, the N preforms 10 formed at a time in the injection molding section 110 are divided into n (n is an integer of 2 or greater) portions, with the result that the M (N/n: M is a natural number) preforms 10 are formed into the intermediate molded products 20 at a time. In the present embodiment, 12 of the preforms 10 formed at a time in the injection molding section 110 are divided into 6 portions, whereby 2 of the preforms 10 are made into the intermediate molded products 20 at a time. That is, according to the present embodiment, the preforms 10 are reversed two by two in the reversal section 156, and two of the preforms 10 at a time are transported to the heat-treating blow mold 141 by the grasping mechanism transport section 155.

The so formed intermediate molded product 20 is transported by the grasping mechanism transport section 155 from the heat-treating blow mold 141 to the final blow mold 144 of the final blow molding section 146, at a timing when the next preform 10 is transported to the heat-treating blow mold 141.

In the final blow molding section 146, the M intermediate molded products 20 are formed into the hollow containers 30, the final molded products, by final blow molding (secondary blow molding), at a timing when the next M preforms 10 are molded into the intermediate molded products 20 in the intermediate blow molding section 143. According to the present embodiment, in the final blow mold 144, 2 of the intermediate molded products 20 are formed into the hollow containers 30, the final molded products, by final blow molding (secondary blow molding), at a timing when the next two preforms 10 are molded into the intermediate molded products 20 in the intermediate blow molding section 143.

Concretely, as shown in FIG. 4(b), with the final blow mold 144 being heated to a predetermined lower temperature (e.g., 80° C. to 120° C.) than the temperature of the heat-treating blow mold 141, high pressure blow air is supplied into each intermediate molded product 20 and, at the same time, a stretching rod 149B is driven to extend. By this procedure, each intermediate molded product 20 is stretched in a vertical axis direction and a horizontal axis direction and pressed against the internal wall surface of the final blow mold 144 to undergo heat treatment. As a result, the hollow container 30, the final molded product, is molded in a desired shape.

As described above, the heat-treating blow mold 141 and the final blow mold 144 are disposed adjacently, and configured to be integrally moved for mold clamping. In the final blow mold 144, therefore, the hollow container 30, which is the final molded product, is molded at the same time that the intermediate molded product 20 is molded in the heat-treating blow mold 141.

The hollow container 30 molded in the final blow mold 144 is transported to a withdrawal position P1 outside the final blow mold 144 by the grasping mechanism transport section 155, as shown in FIG. 4(c), at a timing when the next preform 10 is further transported after inside blow air is discharged as exhaust air.

According to the injection stretch blow molding apparatus 100 of the foregoing configuration, the heat-resistant hollow containers 30 composed of a PET resin or the like can be produced continuously, and the production volume can be increased in comparison with the conventional 1-step apparatus. According to the injection stretch blow molding apparatus 100 as above, moreover, the initial cost can be suppressed compared with the conventional 2-step apparatus, and the space for installation of facilities can be kept relatively limited. Furthermore, the blow clamping device 148 and the grasping mechanism transport section 155 are shared between the intermediate blow molding section 143 and the final blow molding section 146. Thus, the costs of the entire apparatus and the space for facilities installation can be decreased further.

With the blow molding apparatus 100 according to the present embodiment, moreover, the injection-molded preform 10 is cooled to the mold release temperature, and then reheated so that it can be continuously subjected to the heat-treating blow molding (primary blow molding) and the final blow molding (secondary blow molding). Hence, the heat history of the preform 10 can be optimized (uniformalized). Moreover, the blow molding apparatus 100 is an apparatus of the type which reheats the preform 10 still having residual heat present during injection molding to perform double blow molding. Thus, the apparatus can produce the hollow container 30 having a uniform wall thickness distribution and excellent in heat resistance, and raises the energy efficiency as compared with the 2-step apparatus.

The present embodiment is also configured such that the heat-treating blow mold 141 and the final blow mold 144 constituting the blow molding section 140 are arranged adjacently, and integrally clamped. Thus, when the intermediate molded product 20 formed by the heat-treating blow mold 141 is moved to the final blow mold 144, the moving distance of the intermediate molded product 20 is shortened, and the temperature fall of the intermediate molded product 20 is suppressed. Consequently, the intermediate molded product 20 can be formed into the hollow container 30 of a desired shape satisfactorily by the final blow mold 144, and the energy efficiency can be increased.

Incidentally, the present embodiment is configured such that the heat-treating blow mold 141 and the final blow mold 144 are integrally moved for mold clamping and mold opening. However, the molding time (heat-treating blow molding time) t1 of the intermediate molded product 20 in the heat-treating blow mold 141, and the molding time (final blow molding time) t2, during which the heat treatment of the hollow container 30 is completed in the final blow mold 144, are not necessarily coincident. According to the present embodiment, the final blow molding time t2 is longer than the heat-treating blow molding time t1. In detail, the heat-treating blow molding time t1 is the time taken until the heat treatment of the intermediate molded product 20 is completed, whereas the final blow molding time t2 is the time taken until the supply of high pressure blow air into the intermediate molded product 20 is stopped.

Thus, the heat-treating blow mold 141 and the final blow mold 144 are mold-closed and mold-opened in conformity with the heat-treating blow molding time t1, or the final blow molding time t2, whichever is longer (in the present embodiment, the final blow molding time t2).

According to the present embodiment, therefore, there occurs some time lag from the completion of heat treatment of the intermediate molded product 20 in the heat-treating blow mold 141 until start of mold opening of the heat-treating blow mold 141. To deal with it, in the intermediate blow molding section 143, discharge of blow air is started before start of mold opening after completion of heat treatment of the intermediate molded product 20 in the heat-treating blow mold 141. By so doing, the intermediate molded product 20 can be stably contracted when the heat-treating blow mold 141 is opened. Thus, the pinching of the intermediate molded product 20 that could happen during mold closure of the final blow mold 144 is inhibited. Needless to say, blow air within the intermediate molded product 20 may be discharged at a timing when mold opening of the heat-treating blow mold 141 is started.

If many of the hollow containers 30 are continuously formed by the injection stretch blow molding apparatus 100, moreover, it is preferred for the injection molding section 110 to injection mold the preforms 10 in a molding time T fulfilling the conditions of the following Equation (1):

$$T \geq N/M(t+\alpha) \tag{1}$$

where N is the number of the preforms formed at a time in the injection molding section, M is the number of the intermediate molded products formed at a time in the intermediate blow molding section, t is the heat-treating blow molding time t1, or the final blow molding time t2, whichever is longer, and α is the time during which the intermediate molded product 20 moves from the heat-treating blow mold 141 to the final blow mold 144.

A predetermined number (e.g., 12) of the preforms 10 are molded in the injection molding section 110 in the molding time T fulfilling the above conditions, whereby the hollow containers 30 can be continuously molded, with the preforms 10 being transported at a constant speed, so that the production efficiency is increased further.

In the present embodiment, moreover, 12 of the preforms 10 formed at a time in the injection molding section 110 are divided into 6 portions so that 2 of the preforms 10 are formed at a time into the intermediate molded products 20, and that 2 of the intermediate molded products 20 are formed at a time into the hollow containers 30 which are the final molded products. In accordance with the specifications for the desired bottle, there is a case where the same blow molding apparatus 100, for example, molds 16 of the preforms 10 at a time, molds 2 of the preforms 10 at a time into the intermediate molded products 20, and further molds 2 of the intermediate molded products 20 at a time into the hollow molded products 30.

The ratio between the number of the preforms 10 molded in the injection molding section 110 and the numbers of the products simultaneously molded in the intermediate blow molding section 143 and the final blow molding section 146 constituting the blow molding section 140 is preferably set in the manner described below.

If relatively narrow-mouthed (the opening diameter of the neck portion is of the order of 28 to 38 mm) heat-resistant containers with a capacity of the order of 1 to 3 liters are produced by double blow molding using a 1.5-step apparatus, for example, the ratio among the number of the preforms 10 molded in the injection molding section 110, the numbers of the products simultaneously molded in the intermediate blow molding section 143 and the final blow molding section 146 constituting the blow molding section 140, and the number of the preforms 10 cooled at a time in the cooling section 120 desirably satisfies one of the following conditional expressions (2a) to (2f):

$$N:M=6:1 \text{ or } 8:1 \tag{2a}$$

$$N:(M+Mf)=3:1 \text{ or } 4:1 \tag{2b}$$

$$N:M:Mf=6:1:1 \text{ or } 8:1:1 \tag{2c}$$

$$N:Nc:M=6:6:1 \text{ or } 8:8:1 \tag{2d}$$

$$N:Nc:(M+Mf)=3:3:1 \text{ or } 4:4:1 \tag{2e}$$

$$N:Nc:M:Mf=6:6:1:1 \text{ or } 8:8:1:1 \tag{2f}$$

where N is the number of the preforms formed at a time in the injection molding section, Nc is the number of the preforms cooled at a time in the cooling section, M is the number of the intermediate molded products formed at a time in the intermediate blow molding section, and Mf is the number of the hollow molded products formed at a time in the final blow molding section.

It is to be noted that the molding conditions satisfying the above-mentioned conditional expressions are the most preferred ones. However, the number of the preforms 10 formed at a time in the injection molding section 110, the number of the preforms 10 cooled at a time in the cooling section 120, and the numbers of the intermediate molded products 20 and the hollow containers 30 formed at a time in the blow molding section 140 are not particularly limited.

No matter what the number of the products is, it is desirable that for the number (N) of the preforms 10 formed at a time in the injection molding section 110, the M (N/n) preforms 10 be formed at a time into the intermediate molded products 20 in the intermediate blow molding section 143, and the M intermediate molded products 20 be formed into the hollow containers 30 in the final blow molding section 146.

Furthermore, irrespective of the number or the like of the preforms 10 formed at a time in the injection molding section 110, it is preferred in the injection molding section 110 that the preforms be injection molded in the molding time T satisfying the conditions of the aforementioned Equation (1).

The conditional expression (1) can be written more concretely as indicated below. In the case of the present embodiment, as mentioned above, M=Mf and α1=α2.

$$T \geq N/((M+Mf)/2)(t+(\alpha 1+\alpha 2)/2+R) \tag{3}$$

where N is the number of the preforms formed at a time in the injection molding section, M is the number of the intermediate molded products formed at a time in the intermediate blow molding section, Mf is the number of the hollow molded products formed at a time in the final blow molding section, t is the heat-treating blow molding time t1, or the final blow molding time t2, whichever is longer, α1 is the time during which the intermediate molded product moves from the heat-treating blow mold to the final blow mold, α2 is the time during which the hollow container moves from the final blow mold to the withdrawal position, and β is the time taken by the mold clamping device for mold closing or opening the heat-treating blow mold or the final blow mold.

The foregoing features enable the hollow containers 30 having heat resistance to be formed continuously and satisfactorily, and the manufacturing efficiency of the hollow containers 30 to be raised.

In the present embodiment, the heat-treating blow mold and the final blow mold are integrally moved and closed. It goes without saying, however, that the heat-treating blow mold and the final blow mold may be configured to be closable independently of each other.

The one embodiment of the present invention has been described above, but it is to be understood that the invention is in no way limited to this embodiment. The present invention can be changed or modified, as appropriate, without departing from its spirit and scope.

EXPLANATIONS OF LETTERS OR NUMERALS

10 Preform
11 Neck portion
20 Intermediate molded product
30 Hollow container
31 Barrel
32 Concavity
33 Bottom
34 Upper bottom portion
100 Blow molding apparatus (injection stretch blow molding apparatus)
110 Injection molding section
111 Mold clamping mechanism
120 Cooling section
130 Heating section
140 Blow molding section
141 Heat-treating blow mold
142 Bottom mold
143 Intermediate blow molding section (primary blow molding section)
144 Final blow mold
145 Bottom mold
146 Final blow molding section (secondary blow molding section)
147 Blow mold fixing plate
148 Blow clamping device
149A, 149B Stretching rod
150 Transport section 151 Transport line
152 Transport jig
153 Sprocket
155 Grasping mechanism transport section
156 Reversal section

The invention claimed is:

1. A blow molding apparatus, comprising:
an injection molding section, a cooling section, a heating section and a blow molding section, wherein
the injection molding section injection molds a plurality of preforms at a time;
the cooling section cools the injection-molded preforms;
the heating section heats the cooled preforms while continuously transporting them along a transport line; and
the blow molding section blow molds the heated preforms to form hollow containers,
the blow molding section including
a primary blow molding section which is equipped with a heat-treating blow mold and blow molds the preforms moved from the transport line into the heat-treating blow mold to form intermediate molded products, and
a secondary blow molding section which is equipped with a final blow mold and blow molds the intermediate molded products moved from the heat-treating blow mold into the final blow mold to form hollow containers as final molded products,
wherein an amount of time to heat treat the intermediate molded products in the primary blow molding section is different from an amount of time to form the final molded products in the secondary blow molding section,
wherein the blow molding apparatus further comprises a grasping mechanism transport section configured to carry the preforms into the blow molding section, grasp and transport the intermediate products within the blow molding section, grasp the final molded products, and carry the final molded products out of the blow molding section to a withdrawal position, and
wherein the grasping mechanism transport section is shared between the primary blow molding section and the secondary blow molding section.

2. The blow molding apparatus according to claim 1, wherein
the injection molding section injection molds the N (N is an integer of 2 or larger) preforms at a time;
the primary blow molding section divides the N preforms into n portions (n is an integer of 2 or larger), and forms the M (N/n: M is a natural number) preforms, at a time, into the intermediate molded products; and
the secondary blow molding section forms the M intermediate molded products into the hollow containers at a timing when the M intermediate molded products are formed in the primary blow molding section.

3. The blow molding apparatus according to claim 2, wherein
the injection molding section injection molds the preforms in a molding time T fulfilling conditions of the following Equation (1):

$$T \geq N/M(t+\alpha) \quad (1)$$

where t is a heat-treating blow molding time t1, or a final blow molding time t2, whichever is longer, and a is a time during which the intermediate molded product moves from the heat-treating blow mold to the final blow mold.

4. The blow molding apparatus according to claim 1, wherein
the heat-treating blow mold and the final blow mold are disposed adjacently.

5. The blow molding apparatus according to claim 4, wherein
the blow molding section is equipped with a mold clamping device for integrally moving the heat-treating blow mold and the final blow mold and clamping them together.

6. The blow molding apparatus according to claim 1, wherein
the amount of time to form the final molded products in the secondary blow molding section is greater than the amount of time to heat treat the intermediate molded products in the primary blow molding section.

7. The blow molding apparatus according to claim 6, wherein
a discharge of blow air is started after an expiration of the amount of time to heat treat the intermediate molded products and before the heat-treating blow mold is opened.

* * * * *